US008456555B2

(12) United States Patent
Um et al.

(10) Patent No.: US 8,456,555 B2
(45) Date of Patent: Jun. 4, 2013

(54) METHOD AND APPARATUS FOR IMPROVING DYNAMIC RANGE OF IMAGE

(75) Inventors: Kyu-hoi Um, Suwon-si (KR); Sang-jin Lee, Seoul (KR); Na-ri Im, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 785 days.

(21) Appl. No.: 11/941,202

(22) Filed: Nov. 16, 2007

(65) Prior Publication Data

US 2009/0002525 A1 Jan. 1, 2009

(30) Foreign Application Priority Data

Jun. 28, 2007 (KR) ........................ 10-2007-0064613

(51) Int. Cl.
*H04N 5/335* (2006.01)
*H04N 5/235* (2006.01)

(52) U.S. Cl.
USPC .......................................... 348/297; 348/362

(58) Field of Classification Search
USPC .................. 348/241, 240.2, 276, 221.1, 297, 348/362; 358/48; 257/432
See application file for complete search history.

(56) References Cited

U.S. PATENT DOCUMENTS

| | | | |
|---|---|---|---|
| 4,709,259 A * | 11/1987 | Suzuki | 348/280 |
| 7,193,652 B2 | 3/2007 | Hori et al. | |
| 7,554,588 B2 * | 6/2009 | Yaffe | 348/297 |
| 7,956,925 B2 * | 6/2011 | Ogawa et al. | 348/362 |
| 2003/0112864 A1 | 6/2003 | Karczewicz et al. | |
| 2003/0174234 A1 | 9/2003 | Kondo et al. | |
| 2004/0080652 A1 | 4/2004 | Nonaka et al. | |
| 2004/0095486 A1 * | 5/2004 | Yamamoto et al. | 348/240.2 |
| 2005/0045980 A1 * | 3/2005 | Guidash | 257/432 |
| 2005/0151866 A1 | 7/2005 | Ando et al. | |
| 2005/0195281 A1 * | 9/2005 | Misaka et al. | 348/207.99 |
| 2006/0017829 A1 * | 1/2006 | Gallagher | 348/276 |
| 2006/0181625 A1 | 8/2006 | Han et al. | |
| 2007/0035630 A1 | 2/2007 | Lindenstruth et al. | |
| 2007/0171292 A1 * | 7/2007 | Kondo et al. | 348/294 |

FOREIGN PATENT DOCUMENTS

| | | |
|---|---|---|
| JP | 2004064165 A | 2/2004 |
| JP | 2006033381 A | 2/2006 |

OTHER PUBLICATIONS

Color Filter Array Designs Webpage, http://www.quadibloc.com/other/cfaint.htm, p. 3, First color filter on fourth row, Feb. 19, 2006.*
Extended European Search Report issued on Aug. 26, 2010 in counterpart European Application No. 08712300.6.
Communication dated Apr. 22, 2011 from the State Intellectual Property Office of P.R. China issued in counterpart Chinese Patent Application No. 200810009678.0.

(Continued)

*Primary Examiner* — Chieh M Fan
*Assistant Examiner* — Akshay Trehan
(74) *Attorney, Agent, or Firm* — Sughrue Mion, PLLC

(57) ABSTRACT

Provided are a method and apparatus for improving a dynamic range of an image. The method of improving a dynamic range of an image, which is obtained by a sensor unit of an image capture device, includes: creating an input image by using the sensor unit which has a plurality of lines and has different integration times for the individual lines; and creating an interpolated image by performing interpolation filtering on the input image by using neighboring lines of a current line which have different integration times.

22 Claims, 9 Drawing Sheets

OTHER PUBLICATIONS

Communication dated Mar. 30, 2012 issued by the European Patent Office in counterpart European Patent Application No. 08712300.6.
Communication dated May 23, 2012 issued by the Intellectual Property Office of P.R. China in counterpart Chinese Patent Application No. 200810009678.0.
Japanese Office Action dated Jun. 5, 2012 issued by the Japanese Patent Office in counterpart Japanese Patent Application No. 2008-029250.
Communication dated Jan. 15, 2013 issued by the European Patent Office in counterpart European Patent Application No. 08712300.6.

* cited by examiner

METHOD AND APPARATUS FOR IMPROVING DYNAMIC RANGE OF IMAGE

CROSS-REFERENCE TO RELATED PATENT APPLICATIONS

This application claims the priority of Korean Patent Application No. 10-2007-0064613, filed on Jun. 28, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to improving a dynamic range of an image, and more particularly, to improving a dynamic range of an image of a digital image capture device using a sensor by individually adjusting a duration of an integration time on a line by line basis and applying interpolation filtering in consideration of correlation between a current line and neighboring lines.

2. Description of the Related Art

Image capture devices have limited dynamic range and hence are not able to capture an entire illumination range present in a natural scene. When an image has a limited dynamic range, pixels of the image may be placed at either a dark or light side of a histogram of the image. In this case, even in parts of the image which have different brightness, a darker area of the image may have a narrow dynamic range, or the light may saturate in a lighter area so that an object in the image is hard to recognize. In an extreme case, even when there is an object in the image, the object cannot be seen due to the limited dynamic range.

A digital image capture device obtains an image by converting the light collected by a sensor unit into electronic signals. The digital image capture device generally captures an image in a natural scene intact, and can also obtain a darker or lighter image than the actual image according to the duration of an integration time for which the light is collected. In other words, the digital image capture device can obtain a lighter image as the device collects the light for a longer period of time. Therefore, it can be assumed that the darker area has a shorter integration time and the lighter area has a longer integration time.

FIG. 1 shows an actual dynamic range 102 of a natural scene to be captured and a dynamic range 112 of an image capture device.

The dynamic range 102 is an actual dynamic range of the natural scene to be captured, and the dynamic range 112 is a dynamic range of the image capture device. The image capture device has a limited dynamic range which cannot include the entire actual dynamic range of the natural scene. Especially, since in a digital image, which is an 8-bit image, brightness levels are represented by only 0 to 255, the dynamic range of the digital device is not sufficient to represent the natural scene intact.

Thus, parts of the actual dynamic range 102 may not lie within the dynamic range 112 of the image capture device. A range 104 between X and X' corresponds to a dark range of the natural scene, and a range 106 between Y' and Y corresponds to a light range of the natural scene.

In the dynamic range 112 of the image capture device, the range 104 is represented as X which indicates a darkest value of the dynamic range 112, and thus objects in the natural scene within this range are recognized as having the same brightness so that it is difficult to identify the object clearly.

In the same manner, the range 106 is represented by Y which indicates the lightest value of the dynamic range 112 of the image capture device, and thus light saturates an image within this range so that it is impossible to recognize objects in the image.

In order to represent an image naturally as well as improve a limited dynamic range, it is important to stretch brightness contrast of an object appropriately, and conventionally, histogram stretching is generally used to improve the brightness contrast of an image.

However, since the conventional stretching method uses maximum and minimum values of pixels, when there is excessively dark or excessively light noise present in the image, a dynamic range is adjusted, not by the actual brightness, but by the noise, and thus there is a problem in that the result is not desirable. Moreover, when there are artifact pixels, input values of the artifact pixels are 0, and thus, the minimum value of the input pixels becomes 0, and a dynamic range is, therefore, controlled, not by the actual brightness, but by the artifact pixels. Besides such cases where noise or artifact pixels are present in an image, since the amount of lightening or darkening is small, the result of adjusting the dynamic range is not beneficial.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for improving a dynamic range of an image by controlling the dynamic range using interpolation filtering which uses correlation between lines having different integration times set individually based on characteristics of an image.

The present invention also provides a method of enhancing an image, such as improving image detail and reducing noise and movement blurring, by improving a dynamic range of the image by means of image processing using interpolation filtering.

According to an aspect of the present invention, there is provided a method of improving a dynamic range of an image which is obtained by a sensor unit of an image capture device, the method comprising: creating an input image using the sensor unit which has a plurality of lines and has different integration times for the individual lines; and creating an interpolated image by performing interpolation filtering on the input image by using neighboring lines of a current line which have different integration times.

In the creating of the input image, the integration times of the sensor unit may be previously determined for the individual lines.

The creating of the input image may comprise obtaining an initial image using the sensor unit, setting the different integration times for individual lines of the sensor unit by using characteristics of the initial image, and creating the input image using the sensor unit which has the different integration times set for the individual lines.

The creating of the interpolated image may comprise calculating a correlation between the current line and neighboring lines and controlling filter coefficients of the interpolation filtering based on the correlation.

The interpolation filtering may be used to calculate weighted summation which is obtained by multiplying a pixel in the current line and at least one of pixels in each of neighboring lines by a certain weight and adding the multiplied pixel values together.

In the setting of the integration times, the integration times for at least one of the lines may be individually controlled based on a dynamic range of the initial image.

In the setting of the integration times, the integration times for at least one of the lines may be individually controlled based on a noise level of the initial image.

In the setting of the integration times, the integration times for at least one of the lines may be individually controlled based on an amount of movement blurring that occurs when there is movement in the initial image.

The filter coefficients may be determined based on the integration times for the lines.

The filter coefficients may be determined based on a dynamic range of the input image.

According to another aspect of the present invention, there is provided an apparatus for improving an image dynamic range of an image capture device, the apparatus comprising: an input image creating unit which creates an input image by converting light into electronic signals, the light being incident to individual lines for a period of an integration time which is differently set for each line; and an image processing unit which performs interpolation filtering on the input image, by using a current line and neighboring lines which have differently set integration times, and creates an interpolated image.

The input image creating unit may comprise a sensor unit which converts the light, which is incident to the individual lines for the period of the integration time which is differently set for each line, into the electronic signals.

The input image creating unit may comprise a sensor unit which obtains an image by converting the incident light into the electronic signals, and an integration time controlling unit which individually controls the integration times for the lines of the sensor unit using characteristics of an initial image obtained by the sensor unit.

The input image creating unit may comprise a sensor unit which obtains an image by converting the incident light into the electronic signals and an integration time controlling unit which individually controls the integration times for lines of the sensor unit, and the image processing unit comprises a means for transmitting the individually controlled integration times for the lines of the sensor unit by using characteristics of an initial image created by the input image creating unit.

According to yet another aspect of the present invention, there is provided a computer readable recording medium having embodied thereon a computer program for executing any one of the methods of improving a dynamic range of an image which can be possibly implemented.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

In relation to an image display device, a dynamic range of an image is a luminance level of an image ranging from a light area to a dark area, which the image display device can represent. The dynamic range is adjusted by changing pixel values which indicate lightness (such as luminance) of an image. An image display device with a wider dynamic range can have more tonal variations.

Hereinafter, exemplary embodiments of the present invention will be described in detail.

The present invention is for solving problems cased by a limited dynamic range of an image capture device which is not sufficient to fully represent a natural scene. According to the present invention, a dynamic range is enhanced by adjusting the duration of integration time in a sensor unit to achieve different dynamic ranges.

Figure 2A:
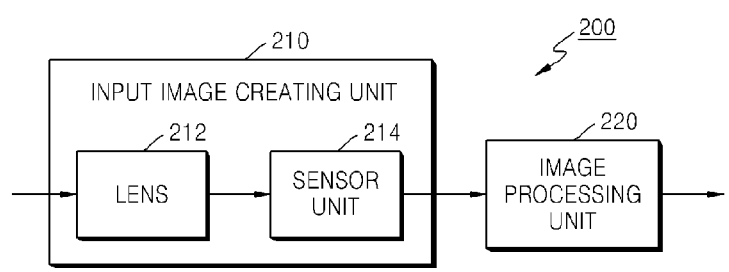
FIG. 2A is a block diagram of an apparatus for improving a dynamic range of an image, according to an exemplary embodiment of the present invention.

FIG. 2A is a block diagram of an apparatus 200 for improving a dynamic range of an image, according to an exemplary embodiment of the present invention.

The apparatus 200 includes an input image creating unit 210, and an image processing unit 220. The input image creating unit 210 includes a lens 212, and a sensor unit 214.

The input image creating unit 210 creates an input image using a sensor that has different durations of integration time for individual lines when light is incident to the sensor, and outputs the created image to the image processing unit 220.

The lens 212 focuses the light passing through the lens 212 in the direction of the sensor unit 214 which senses the light.

The sensor unit 214 senses the light focused on it by the lens 212, converts the light into electronic signals to create an input image, and outputs the image to the image processing unit 220. The sensor unit 214 includes a charge-coupled device (CCD) sensor or a complementary metal-oxide-semiconductor (CMOS) sensor which is composed of n×M pixels, collects the light that is incident to the pixels, and converts the light into the electronic signals. Individual information obtained by each pixel of the sensor unit 214 corresponds to individual pixel of the image. Thus, the sensor unit 214 can control the duration of integration time on the basis of a line of the pixel to control the duration of integration time for each line of the image.

The durations of integration time for lines of the sensor unit 214 are previously set to differ from each other. Since an image capture device which is placed in a fixed location or constant environment has a certain optimum duration of integration time, a sensor unit with a fixed duration of integration time for each line is used for such an image capture device.

The image processing unit 220 processes the input image created by the input image creating unit 210 and outputs an interpolated image. According to the present exemplary embodiment, the image processing unit 220 processes the input image by applying interpolation filtering to the image in consideration of correlation between a current line and neighboring lines which have different durations of integration time so that the apparatus 200 can improve the limited dynamic range to a wider dynamic range by using the information including a different dynamic range.

Figure 2B:
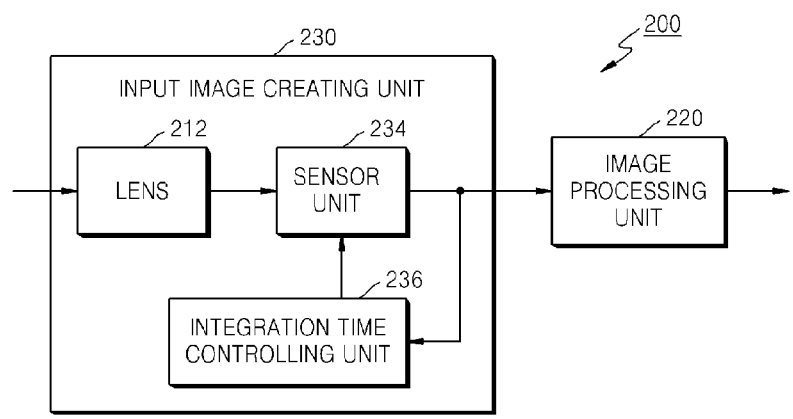
FIG. 2B is a block diagram of an apparatus for improving a dynamic range of an image, according to another exemplary embodiment of the present invention.

FIG. 2B is a block diagram of an apparatus 200 for improving a dynamic range of an image, according to another exemplary embodiment of the present invention.

Referring to FIG. 2B, the apparatus 200 includes an input image creating unit 230, and an image processing unit 220. The input image creating unit 230 includes a lens 212, a sensor unit 234, and an integration time controlling unit 236. In this exemplary embodiment, the structures and functions of the lens 212 and the image processing unit 220 are the same as those of the lens 212 and the image processing unit 220 in FIG. 2A.

The input image processing unit 230 sets the optimum duration of integration time using characteristics of an input image so as to set the durations of integration time for individual lines, creates an input image, and outputs the image to the image processing unit 220.

The sensor unit 234 converts the light incident from the lens 212 into electronic signals, and outputs the signals to the integration time controlling unit 234 and the image processing unit 220. Although the function of the sensor unit 234 is similar to the sensor unit 214 in FIG. 2A, the durations of integration time of the sensor unit 234 can be variably controlled. The image initially obtained by the sensor unit 234 is used to calculate the optimum duration of integration time.

The integration time controlling unit 236 calculates the duration of integration time of the sensor unit 234 which senses the light, and outputs the calculated duration of integration time to the sensor unit 234 and the image processing unit 220. Since the duration of integration time has to be set for each line, the integration time controlling unit 236 needs to determine the duration of integration time for each line.

According to the present exemplary embodiment shown in FIG. 2B, the characteristics of the initial image obtained by the sensor unit 234 are analyzed and the durations of integration time are controlled based on the characteristics. Since the characteristics of the initial image have to be analyzed based on the dynamic range when the duration of integration time of the sensor unit 234 is constant, the initial image which is obtained before the duration of integration time for each line of the sensor unit 234 is set should be used.

Figure 2C:
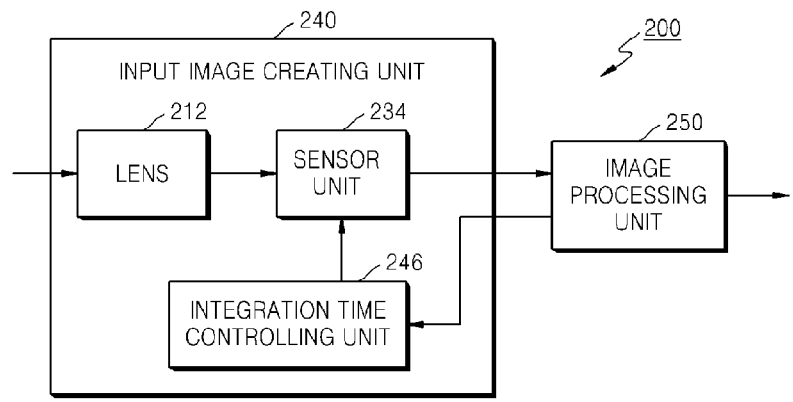
FIG. 2C is a block diagram of an apparatus for improving a dynamic range of an image, according to another exemplary embodiment of the present invention.

FIG. 2C is a block diagram of an apparatus 200 for improving a dynamic range of an image, according to another exemplary embodiment of the present invention. Referring to FIG. 2C, the apparatus 200 includes an input image creating unit 240, and an image processing unit 250. The input image creating unit 230 includes a lens 212, a sensor unit 234, and an integration time controlling unit 246. The structures and functions of the lens 212 and the sensor unit 234 are the same as those of the lens 212 and the sensor unit 234 in FIG. 2B.

The input image creating unit 240 creates an initial image and outputs it to the image processing unit 250, and creates an input image and outputs it to the image processing unit 250. The input image has a differently set integration time for each line which is received from the image processing unit 250.

The integration time controlling unit 246 receives the integration time, which is differently controlled for individual lines, from the image processing unit 250 and controls the integration time of each line of the sensor unit 234.

The image processing unit 250 calculates the optimal duration of integration time for each line using the initial image obtained by the sensor unit 234, and outputs the optimal duration of integration time to the integration time controlling unit 246 of the input image creating unit 240. Additionally, the image processing unit 250 processes the input image created by the input image creating unit 210 and outputs an interpolated image, like the image processing unit 220 in FIG. 2A or 2B.

In FIG. 2B, the integration time controlling unit 236 determines the duration of integration time for each line of the sensor unit 234, and controls the integration time for the sensor unit 234. However, according to the exemplary embodiment illustrated in FIG. 2C, the image processing unit 250 determines the duration of integration time for each line of the sensor unit 234, and the integration time controlling unit 246 controls the integration time for the sensor unit 234 based on the integration time determined by the image processing unit 250.

Hereinafter, with reference to FIGS. 3A to 3D, characteristics of images which are obtained with different integration times will be described in a comparative manner.

In general, the amount of light incident to a sensor is proportional to the duration of integration time. When the light is collected for a sufficient duration of time, the amount of light incident to the sensor can be increased so that a dynamic range of a dark area of an image can be enhanced. Conversely, the shorter integration time results in a lesser amount of the light incident to the sensor, which improves the dynamic range of a bright area of an image so that the image with more details in the bright part can be obtained. However, in this case, the dynamic range of a dark area decreases, which causes less subtle tonal graduations.

Therefore, when the image is extremely light, the duration of integration time needs to be shortened, and when the image is too dark, the duration of integration time is controlled to be increased so as to collect sufficient light.

Figure 3A:
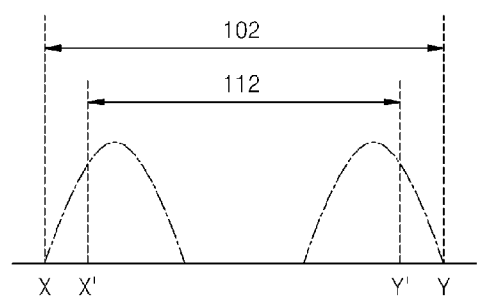
FIG. 3A shows an actual dynamic range of an object to be captured and a dynamic range of an image capture device.

FIG. 3A shows an actual dynamic range 102 of an object to be captured and a dynamic range 112 of an image capture device.

Figure 1:
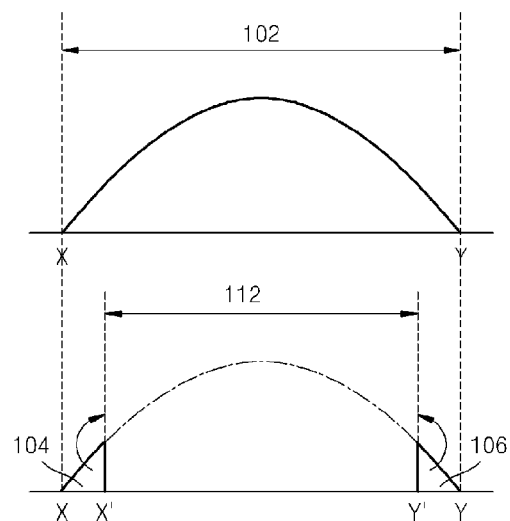
FIG. 1 shows an actual dynamic range of a natural scene to be captured and a dynamic range of an image capture device.

Like the graph shown in FIG. 1, the actual dynamic range 102 of the object present in a natural scene ranges from X to Y, and the dynamic range 112 of the image capture device varies from X' to Y'. The object to be captured has significant information only about its bright and dark ranges, not about the mid-tone range. Since the dynamic range 112 of the image capture device cannot cover all the dynamic range 102 of the object, the image capture device cannot fully represent the object and consequently has limited tonal graduations.

Figure 3B:
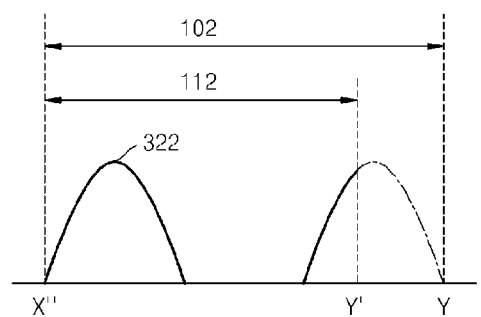
FIG. 3B shows a dynamic range of an image capture device when it has a longer integration time.

FIG. 3B shows a dynamic range of an image capture device when it has a longer integration time.

When the light is collected for a longer period of time, more light is incident to a sensor, which allows the darker area of the image to be represented. Although the dynamic range 112 of the image capture device is constant, the image capture device can have the dynamic range varying from X", which is close to X of the dynamic range 102 of the object, by increasing the integration time. Hence, the entire information of the light range 332 which cannot be obtained in FIG. 3A can be achieved. However, since the dynamic range 112 of the image capture device is fixed, Y' is accordingly moved to Y" and the distance between Y' and Y" is the same as the distance between X' and X". The light area is saturated in proportion to the amount of the incident light, and thus more specified information of the light area can be obtained.

Figure 3C:
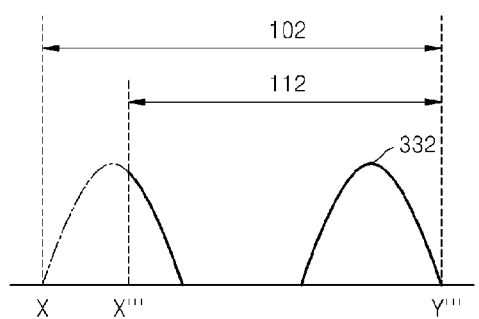
FIG. 3C shows a dynamic range of the image capture device when it has a short integration time.

FIG. 3C shows a dynamic range 112 of the image capture device when it has a short integration time.

When the integration time is short, less light is incident to a sensor, which allows the lighter area of the image to be presented. By decreasing the integration time, the image capture device can obtain the information about the dark range up to Y''' which is close to Y of the dynamic range of the object. Therefore, the entire information of the dark area 332 can be obtained, while it cannot be obtained in FIG. 3A. Since the dynamic range 112 of the image capture device is fixed, X is moved to X''' the same distance as Y is moved to Y'''. Thus, less light is incident, and consequently specified information of the darker area can be achieved.

Figure 3D:
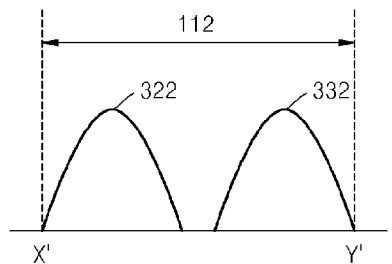
FIG. 3D shows a dynamic range of the image capture device when interpolation filtering is performed using short and long lines, according to an exemplary embodiment of the present invention.

FIG. 3D shows a dynamic range of the image capture device when interpolation filtering is performed using short and long lines, according to an exemplary embodiment of the present invention.

When the characteristics of each image obtained when the integration time is long and short are used, the insufficient dynamic range of each case can be compensated for, and thus the details of dark and light areas can be represented. Although the dynamic range 112 of the image capture device is fixed, the information of the light and dark areas can be displayed using the pieces of information 322 and 332 which are obtained when the integration time is long and when it is short.

According to the current exemplary embodiment of the present invention, although luminance values of the information 322 and 332 of the light and dark areas are placed closer to each other in the middle luminance range, compared to the luminance values of the actual object to be captured, it is efficient to represent the image having more details in the dark and light areas when the image does not have significant information in the mid-tone range.

Accordingly, the dark area of the object present in a natural scene with a wider dynamic range which the conventional image capture device cannot represent can be represented in detail, and an excessively light image which is difficult to be recognized can be prevented.

In the case of an image with extremely dark and light areas, if the integration time is increased to enhance the dynamic range of the dark area, in the light area, light may saturate. In the same manner, if the integration time is reduced to enhance the tonal graduations in the light area, the entire image can be darkened and thus the tonal graduations in the originally dark area can deteriorate. Therefore, it is required to set the integration time in consideration of the dark and light areas.

In the present invention, the integration time is not set for the entire image, but is set for individual lines, and correlation between a current line and neighboring lines and such differently set integration times are used to obtain a wider dynamic range.

According to the present invention, the integration time controlling unit 236 or the image processing unit 250 determines the integration time for each line using the characteristics of the initial image. The usable characteristics of the initial image may include grayscale distribution, the amount of noise, and the intensity of movement of an object to be captured. The duration of integration time for each line, and how many lines will have different lengths may be determined.

Figure 4A:
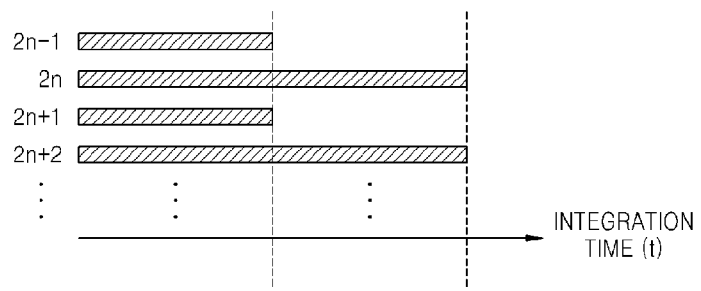
FIG. 4A shows examples for explaining how a sensor unit in FIGS. 2A to 2C controls the integration time for each line.

FIG. 4A shows examples for explaining how the sensor unit 214 or 234 in FIGS. 2A to 2C controls the integration time for each line.

In FIG. 4A, the odd numbered and even numbered lines of the sensor unit 214 or 234 have different integration times. Since the odd numbered lines have shorter integration times than the even numbered lines, the image is darker than when the integration time is longer, and since the even numbered lines have longer integration times than the odd numbered lines, the image is lighter than when the integration time is shorter. Thus, the odd numbered lines are effective when too much light is incident to the sensor unit 214 or 234 and the image is excessively light, and the even numbered lines are effective when it is too dark to recognize the object.

In the current exemplary embodiment of the present invention, the lines having different integration time are at least one. Thus, as shown in FIG. 4A, the integration times can be set individually for the odd numbered lines and the even numbered lines, or, for example, the only one line of an image may have an integration time different from the other lines.

Figure 4B:
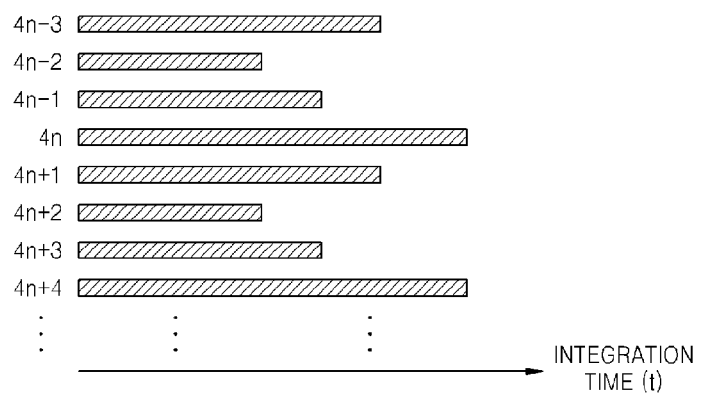
FIG. 4B shows an example for explaining how the sensor unit in FIGS. 2A to 2C controls the integration time for each line.

FIG. 4B shows an example for explaining how the sensor unit 214 or 234 in FIGS. 2A to 2C controls the integration time for each line.

In FIG. 4B, different integration times are set for every four neighboring lines repeatedly. In this case, image processing can be performed by applying interpolation filtering using different characteristics of dynamic ranges of the lines even when a plurality of lines have different integration times.

Interpolation filtering performed by the image processing unit 220 and 250 in FIGS. 2A to 2C will now be described.

The image processing unit 220 and 250 performs interpolation filtering on lines using correlation between the lines with different integration times. The correlation between lines is defined based on the characteristics and integration time of the input image. In the current exemplary embodiment, the interpolation filtering using the lines is performed using a vertical interpolation filter. A coefficient of the interpolation filter is decided based on the correlation between lines.

The correlation between lines and the coefficient of the interpolation filter may be determined in consideration of characteristics of the input image, for example, the characteristics of dynamic range of the input image, whether noise is present in the input image, and whether a moving object is present in the input image. According to the present invention, since the integration time is set for each line, the brightness of the image can vary according to integration time. Therefore, the coefficient of the interpolation filter needs to be determined so that the resulting image after interpolation filtering is performed can be reasonably bright.

Since the integration time is determined in consideration of the image characteristics such as the dynamic range of the image, it can be assumed that factors to determine the coefficients of the interpolation filter are the various characteristics of the image.

The lines with a shorter integration time are more advantageous for presentation of details in a light area of an image, and the lines with a longer integration time are more beneficial to presentation of details in a dark area. Hereinafter, it is assumed that the odd numbered lines have a shorter integration time and the even numbered lines have a longer integration time.

The image processing units 220 and 250 enhance the details of both the light and dark areas by performing interpolation filtering based on correlation between the odd numbered lines and the even numbered lines.

For example, to compensate for a narrower dynamic range of a dark area of an odd numbered line which has a shorter integration time, an even numbered line which has a wider dynamic range of a dark area is used for the interpolation filtering. The dynamic range of the dark area of the odd numbered line can be compensated for by using information about the dark area of the even numbered line.

In the same manner, to compensate for a narrower dynamic range of a light area of the even numbered line which has a longer integration time, the odd numbered line which has a wider dynamic range of a light area is used for the interpolation filtering. That is, the dynamic range of the light area of the even numbered line can be compensated for by using information about the light area of the odd numbered line.

According to an exemplary embodiment of the present invention, performance of interpolation filtering on a pixel in an nth line will be now described.

The interpolation filtering is performed by adding a value obtained by multiplying the current pixel on the nth line by a certain weight and a value obtained by multiplying at least one of neighboring pixels which have a different integration time than the current pixel by a certain weight.

When it is assumed that a three tap interpolation filter of [a, b, c] is used, a value of the current pixel on the nth line is x, a value of a neighboring pixel on an (n+1)th line is y, and a value of a neighboring pixel on an (n−1)th line is z, a value of the interpolated pixel is obtained by the equation $X'=a*y+b*x+c*z$.

As shown in the above equation, coefficients for the neighboring lines are set based on the integration time and a dynamic range of an image, and these are applied as weights to the pixel values used for interpolation filtering.

Figure 5A:
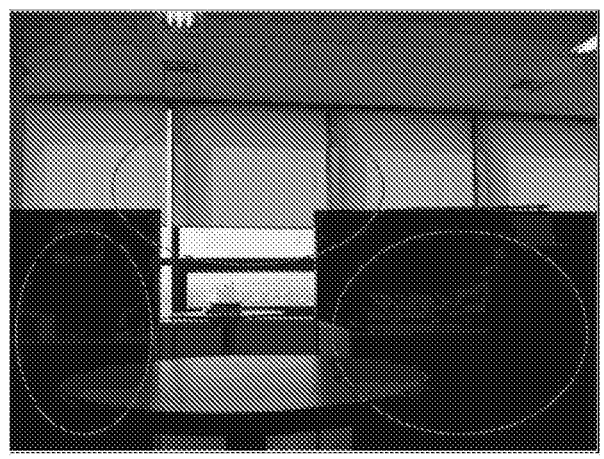
FIG. 5A shows an image which has a narrow dynamic range in a dark area.

FIG. 5A shows an image which has a narrow dynamic range in a dark area.

As described above, since an integration time of a dark image is shorter than that of a light image, a dynamic range of a light area is sufficient but it is hard to represent grayscales of a dark area. As shown in circled parts of FIG. 5A, while lighter areas around the windows and fluorescent lamps are well represented with a rich grayscale, areas around a table are too dark for desks and objects on the desks to be recognizable and also details such as boundaries between the table and desks are not fully displayed.

Figure 5B:
FIG. 5B shows an image which has a narrow dynamic range in a light area.

FIG. 5B shows an image which has a narrow dynamic range in a light area.

When the dynamic range of a light area is narrow, unlike when the dynamic range of a dark area is narrow, the integration time is long so that the grayscales in the dark area can be fully represented, but details in the light area cannot be displayed due to the excessive light. When circled parts in FIG. 5B are compared to those in FIG. 5A, the objects on the desk are recognizable, such details as the boundaries between the table and desks are fully displayed, and the grayscales are richly represented. However, an area around widows is so light that window blinds and window frames cannot be recognized. That is, the grayscales in the light area cannot be represented and thus the details are diminished.

Figure 6:
FIG. 6 shows an image which has different integration times for individual lines.

FIG. 6 shows an image which has different integration times for individual lines.

In FIG. 6, the image is produced by an image dynamic range improving apparatus which includes sensors having odd numbered lines with a longer integration time and even numbered lines with a shorter integration time, and image processing has not yet been performed on the image. The image in FIG. 6 is created by capturing the same image as shown in FIG. 5A or 5B using individual lines that have different integration times. Therefore, the odd numbered lines have a shorter integration time so that details in the light area of an image can be fully shown, and the even numbered lines have a longer integration time so that more grayscales in the dark area can be displayed.

Figure 7:
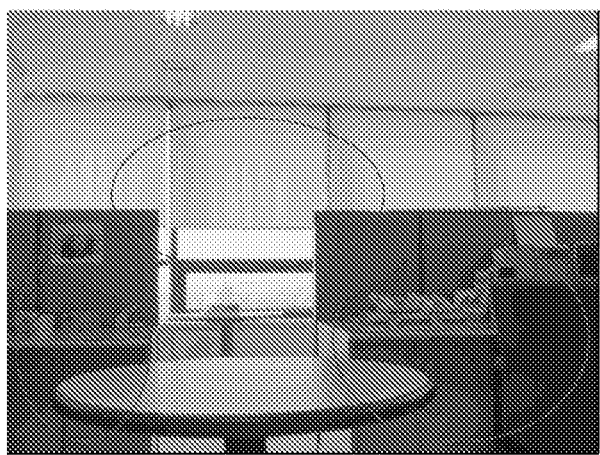
FIG. 7 shows an image obtained after an interpolation filtering is applied, according to an exemplary embodiment of the present invention.

FIG. 7 shows an image obtained after interpolation filtering is applied, according to an exemplary embodiment of the present invention.

To simply implement the interpolation filtering according to the current exemplary embodiment, a vertical interpolation filter of [0.25, 0.5, 0.25] is used. Coefficients of the interpolation filter are set to maintain an average brightness of the image. Since the integration times are set differently for the odd numbered lines and the even numbered lines, a three tap filter is used. Since the integration times between the odd numbered lines are identical to each other and the integration times between the even numbered lines are identical to each other, the first and third coefficients of the interpolation filter are the same as each other.

The image of FIG. 7 is produced by performing the interpolation filtering using the odd numbered lines and the even numbered lines of the image in FIG. 6, and the general grayscale representation is enhanced. While the desks and the objects on the desks in the image illustrated in FIG. 5A cannot be identified since the dynamic range of the darker area is not sufficient, the desks and objects on the desks in the corresponding area of the image in FIG. 7 are shown clearly. Also, while the windows, the window blinds, and the window frames in FIG. 5B are not identified due to excessive light, details around the windows in the corresponding area of the image in FIG. 7 are definitely shown.

Hence, by performing the interpolation filtering using the lines with different integration times, the characteristics of the wider dynamic range of the light area of the image with the shorter integration time and the characteristics of the narrower dynamic range of the dark area of the image with the longer integration time are combined, and thus, the general grayscale representation of the image is enhanced.

Hereinafter, other fields to which the interpolation filtering by using lines with different integration times can be applied to will now be described.

Controlling the length of the integration times so as to enhance grayscale representation can be beneficially used for other image processing methods. Since the integration time closely correlates with the brightness of an image, the present invention can be applied to any cases affected by the brightness.

For example, when an integration time is longer, light is captured for a long period of time and an image can be lightened, but movement blurring may occur while the light is captured. If the integration time is shortened to prevent the movement blurring, the grayscale representation is weakened. Thus, according to the exemplary embodiment of the present invention, the integration times of individual lines are differently controlled so that the movement blurring can be prevented as well as enhancing the grayscale representation.

That is, the lines with a shorter integration time are effective in preventing the movement blurring and the lines with a longer integration time are beneficial for improving the grayscale representation. Accordingly, by applying interpolation filtering using these lines, an image with darker areas having a rich grayscale representation and less movement blurring can be produced.

When the integration time is shorter, an image may be darker and more noises can occur in the image. If the integration time is increased to prevent the noises, in lighter areas of the image, the light may become saturated. Thus, the integration time may be controlled so as to be less affected by the noises and prevent excessive light exposure.

According to another exemplary embodiment of the present invention, the integration times for individual lines are controlled so that lines with a longer integration time can prevent the noises and lines with a shorter integration time can enhance the lighter areas of the image in which the light saturates.

As described above, according to the exemplary embodiments implemented by the image processing unit, details in the darker areas which have the limited grayscale representation and in the lighter areas in which the light becomes saturated can be improved, and also the movement blurring and noises can be prevented so that the quality of the image can be enhanced.

Hereinafter, a method of improving a dynamic range of an image will now be described with reference to FIGS. 8A and 8B.

Figure 8A:
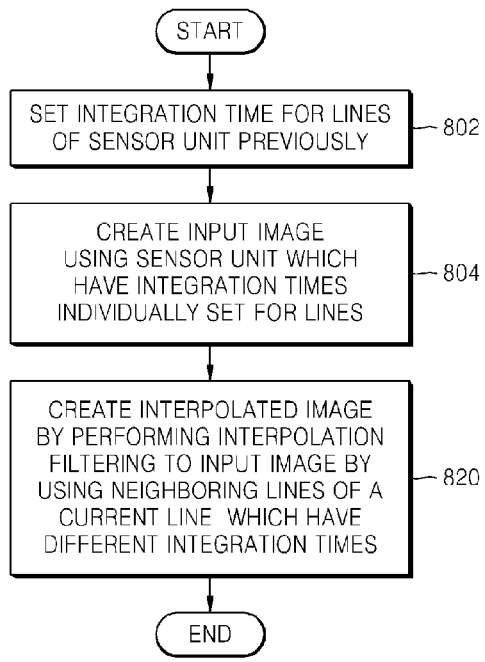
FIG. 8A is a flowchart illustrating a method of improving a dynamic range of an image, according to an exemplary embodiment of the present invention.

FIG. 8A is a flowchart illustrating a method of improving a dynamic range of an image, according to an exemplary embodiment of the present invention.

In operation 802, integration times of individual lines of a sensor unit are differently set. The integration times are determined in consideration of an environment where an image capture device is used.

In operation 804, an input image is produced by the sensor unit which has different integration times set for individual lines.

In operation 820, an interpolated image is produced by applying interpolation filtering to the input image created in operation 840 by using neighboring lines having different integration times. Coefficients of an interpolation filter are decided in consideration of a correlation between a current line and neighboring lines having different integration times. The correlation is obtained based on image characteristics such as the integration times and dynamic ranges.

Figure 8B:
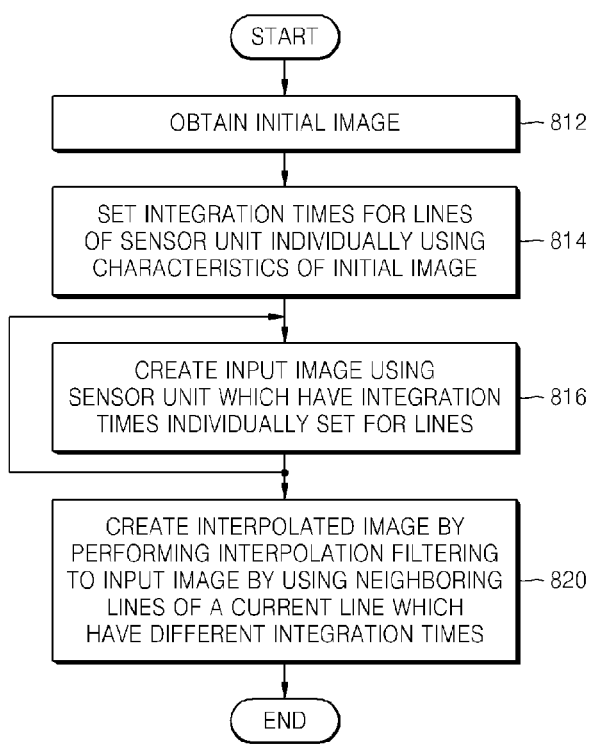
FIG. 8B is a flowchart illustrating a method of improving a dynamic range of an image, according to another exemplary embodiment of the present invention.

FIG. 8B is a flowchart illustrating a method of improving a dynamic range of an image, according to another exemplary embodiment of the present invention.

In operation 812, an initial image is obtained by a sensor unit.

In operation 814, integration times for individual lines of the sensor unit are differently set using characteristics of the initial image.

In operation 816, an input image is created by the sensor which has different integration times for individual lines.

In operation 820, interpolation filtering is performed to the input image by using neighboring lines with different integrating times and an interpolated image is produced. Coefficients of an interpolation filter are obtained in consideration of the set integration times and a dynamic range of the input image.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

According to the present invention, a method and apparatus for improving a dynamic range of an image can produce a wider dynamic range by performing interpolation filtering using a correlation between lines having different integration times which are set individually.

A sensor unit can have different integration times for individual lines, and for example, the integration times for odd numbered lines and for even numbered lines can be differently set. The integration times are determined in consideration of a dynamic range, a noise level, and movement blurring of an image.

The interpolation filtering is performed in consideration of image characteristics such as a dynamic range and the integration times of the sensor unit, as well as the correlation between lines. Image processing using the interpolation filtering can achieve reduction of noise and movement blurring in the image as well as improvement of details of the image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of improving a dynamic range of an image which is obtained by a sensor unit of an image capture device, the method comprising:

obtaining a single initial image using the sensor unit;

analyzing a plurality of separate dynamic ranges for a plurality of lines of the single initial image;

setting integration times for the plurality of lines of the sensor unit to achieve different dynamic ranges for neighboring lines of the plurality of lines by using the analyzed dynamic ranges for the plurality of lines of the initial image; and creating an input image using the sensor unit which has the integration times set for the plurality of lines, wherein an individual line of the plurality of lines has a different integration time controlled individually from integration times of neighboring lines of the individual line to achieve the different dynamic ranges for the individual line and the neighboring lines; and creating an interpolated image by performing interpolation filtering on the input image by using neighboring lines of a current line of the plurality of lines which have different integration times from an integration time of the current line, wherein a line of the plurality of lines consists of a row of a plurality of pixels which have a same integration time with each other.

2. The method of claim 1, wherein in the creating the input image, the integration times of the sensor unit are previously determined for the plurality of lines.

3. The method of claim 1, wherein the creating the interpolated image comprises:

calculating a correlation between the current line and the neighboring lines; and controlling filter coefficients of the interpolation filtering based on the correlation.

4. The method of claim 3, wherein the interpolation filtering is used to calculate weighted summation which is obtained by multiplying a pixel value of a pixel in the current line by a certain weight and multiplying at least one of pixel value of pixels in each of the neighboring lines by another weight and adding the multiplied pixel values together.

5. The method of claim 3, wherein the filter coefficients are determined based on the integration times for the plurality of lines.

6. The method of claim 3, wherein the filter coefficients are determined based on a dynamic range of the input image.

7. The method of claim 1, wherein in the setting the integration times, the integration times for the plurality of lines are individually controlled based on a dynamic range of the initial image.

8. The method of claim 1, wherein in the setting the integration times, the integration times for the plurality of lines are individually controlled based on a noise level of the initial image.

9. The method of claim 1, wherein in the setting the integration times, the integration times for the plurality of lines are individually controlled based on an amount of movement blurring that occurs if there is movement in the initial image.

10. An apparatus for improving an image dynamic range of an image capture device, the apparatus comprising:
    a sensor unit which obtains a single initial image by converting incident light into electronic signals;
    an integration time controlling unit which analyzes a plurality of separate dynamic ranges for a plurality of lines of the single initial image, individually controls integration times for the plurality of lines of the sensor unit to achieve different dynamic ranges for neighboring lines of the plurality of lines using the analyzed dynamic ranges for the plurality of lines of the initial image obtained by the sensor unit, wherein an individual line of the plurality of lines has a different integration time controlled individually from integration times of neighboring lines of the individual line to achieve the different dynamic ranges for the individual line and the neighboring lines, and the sensor creates an input image by using the controlled integration times; and
    an image processing unit which performs interpolation filtering on the input image, by using a current line of the plurality of lines and neighboring lines of the current line which have different integration times from an integration time of the current line, and creates an interpolated image,
    wherein a line of the individual lines consists of a row of a plurality of pixels which have a same integration time with each other.

11. The apparatus of claim 10, wherein the image processing unit comprises:
    a correlation calculation unit which calculates correlation between the current line and the neighboring lines;
    an interpolation filter creating unit which controls interpolation filter coefficients of the interpolation filtering based on the correlation; and
    an interpolation filtering unit which performs the interpolation filtering using the interpolation filter.

12. The apparatus of claim 11, wherein the interpolation filtering is used to calculate weighted summation which is obtained by multiplying a pixel value of a pixel in the current line and at least one of pixel value of pixels in each of the neighboring lines by a certain weight and adding the multiplied pixel together.

13. The apparatus of claim 11, wherein the interpolation filter creating unit determines the interpolation filter coefficients based on the integration times for the plurality of lines.

14. The apparatus of claim 11, wherein the interpolation filter creating unit determines the interpolation filter coefficients based on a dynamic range of the input image.

15. The apparatus of claim 10, wherein the integration time controlling unit controls and sets at least one of the integration times for the plurality of lines differently based on a dynamic range of the initial image.

16. The apparatus of claim 10, wherein the integration time controlling unit controls and sets at least one of the integration times for the plurality of lines differently based on a noise level of the initial image.

17. The apparatus of claim 10, wherein the integration time controlling unit controls and sets at least one of the integration times for the plurality of lines differently based on an amount of movement blurring that occurs when there is movement in the initial image.

18. The apparatus of claim 10, wherein the image processing unit controls and sets at least one of the integration times for the plurality of lines differently based on a dynamic range of the initial image.

19. The apparatus of claim 10, wherein the image processing unit controls and sets at least one of the integration times for the plurality of lines differently based on a noise level of the initial image.

20. The apparatus of claim 10, wherein the image processing unit controls and sets at least one of the integration times of the plurality of lines differently based on an amount of movement blurring that occurs if there is movement in the initial image.

21. A non-transitory computer readable recording medium having embodied thereon a computer program for executing a method of improving a dynamic range of an image which is obtained by a sensor unit of an image capture device, the method comprising:
    obtaining a single initial image using the sensor unit;
    analyzing a plurality of separate dynamic ranges for a plurality of lines of the single initial image;
    setting integration times for the plurality of lines of the sensor unit to achieve different dynamic ranges for neighboring lines of the plurality of lines by using the analyzed dynamic ranges for the plurality of lines of the initial image; and
    creating an input image using the sensor unit which has the integration times set for the plurality of lines, wherein an individual line of the plurality of lines has a different integration time controlled individually from integration times of neighboring lines of the individual line to achieve the different dynamic ranges for the individual line and the neighboring lines; and
    creating an interpolated image by performing interpolation filtering on the input image by using neighboring lines of a current line of the plurality of lines which have different integration times from an integration time of the current line,
    wherein a line of the plurality of lines consists of a row of a plurality of pixels which have a same integration time with each other.

22. An apparatus for improving an image dynamic range of an image capture device, the apparatus comprising:
    a sensor unit which obtains a single initial image by converting incident light into electronic signals;
    an integration time controlling unit which individually controls integration times for a plurality of lines of the sensor unit, wherein an individual line of the plurality of lines has a different integration time controlled individually from integration times of neighboring lines of the individual line to achieve different dynamic ranges for the individual line and the neighboring lines, and the sensor creates an input image by using the controlled integration times; and an image processing unit which analyzes a plurality of separate dynamic ranges for the plurality of lines of the single initial image and determines the integration times for the plurality of lines to achieve different dynamic ranges for neighboring lines of the plurality of lines by using the analyzed dynamic ranges for the plurality of lines of the initial image, performs interpolation filtering on the input image, by using a current line of the plurality of lines and neighboring lines of the current line which have different integration times from an integration time of the current line, and creates an interpolated image, wherein the integration time controlling unit individually controls the integration times of the plurality of lines based on the integration times determined by the image processing unit, and wherein a line of the individual lines consists of a row of a plurality of pixels which have a same integration time with each other.

* * * * *